United States Patent
Sun et al.

(10) Patent No.: US 11,151,976 B2
(45) Date of Patent: Oct. 19, 2021

(54) METHODS AND SYSTEMS FOR OPERATING A SIGNAL FILTER DEVICE

(71) Applicant: ZHEJIANG DAHUA TECHNOLOGY CO., LTD., Zhejiang (CN)

(72) Inventors: Zhiyong Sun, Hangzhou (CN); Qi Chen, Hangzhou (CN); Wei Fang, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 16/850,030

(22) Filed: Apr. 16, 2020

(65) Prior Publication Data

US 2020/0243061 A1    Jul. 30, 2020

Related U.S. Application Data

(63) Continuation of application No. PCT/CN2018/110759, filed on Oct. 18, 2018.

(30) Foreign Application Priority Data

Oct. 19, 2017  (CN) .......................... 201710976291.1

(51) Int. Cl.
*G10K 11/178*  (2006.01)
*G10K 15/12*  (2006.01)

(52) U.S. Cl.
CPC .. *G10K 11/17854* (2018.01); *G10K 2210/108* (2013.01)

(58) Field of Classification Search
CPC .................. G10K 11/17854; G10K 2210/108
(Continued)

(56) References Cited

U.S. PATENT DOCUMENTS

| 8,891,786 | B1 | 11/2014 | Wang |
| 2004/0223535 | A1 | 11/2004 | You et al. |

(Continued)

FOREIGN PATENT DOCUMENTS

| CN | 1668058 A | 9/2005 |
| CN | 101106405 A | 1/2008 |

(Continued)

OTHER PUBLICATIONS

Wang Zhengteng et al., Application of Improved NLMS Algorithm in Echo Cancellation System, Computer Engineering and Applications, 53(10):107-111, 2017.

(Continued)

*Primary Examiner* — Lee Nguyen
(74) *Attorney, Agent, or Firm* — Metis IP LLC

(57) ABSTRACT

A method and system for operating a signal filter device are provided in the present disclosure. The signal filter device may include M adaptive filters, M first analysis filters, M second analysis filters, and a controller. M may be an integer above two. The method may include generating, by the M first analysis filters, M first sub-band signals based on an input signal. The method may also include generating, by the M second analysis filters, M second sub-band signals based on a reference signal. The method may further include adjusting, by the controller, the working states of the M adaptive filters based on correlations between the M first sub-band signals and the M second sub-band signals.

18 Claims, 9 Drawing Sheets

(58) Field of Classification Search
USPC .................. 379/406.08; 370/286–292; 381/71.1–71.14; 455/570
See application file for complete search history.

(56) References Cited

U.S. PATENT DOCUMENTS

| | | |
|---|---|---|
| 2008/0240415 A1 | 10/2008 | Mohammad et al. |
| 2009/0245335 A1 | 10/2009 | Fang |
| 2009/0245502 A1 | 10/2009 | Liu |
| 2009/0252316 A1* | 10/2009 | Ratmanski ............ H04M 3/56 379/202.01 |
| 2013/0243183 A1 | 9/2013 | Lou |
| 2014/0169568 A1 | 6/2014 | Li et al. |
| 2014/0329568 A1 | 11/2014 | Xue et al. |
| 2014/0348276 A1* | 11/2014 | Pandey ............... H04B 3/23 375/350 |
| 2015/0078564 A1 | 3/2015 | Guo et al. |
| 2015/0349841 A1 | 12/2015 | Mani et al. |
| 2016/0309042 A1 | 10/2016 | Kechichian et al. |
| 2017/0372722 A1* | 12/2017 | Li ...................... G10L 25/06 |
| 2018/0255183 A1 | 9/2018 | Zhou |

FOREIGN PATENT DOCUMENTS

| | | |
|---|---|---|
| CN | 101227537 B | 12/2010 |
| CN | 101917527 A | 12/2010 |
| CN | 102185991 A | 9/2011 |
| CN | 102377454 B | 9/2014 |
| CN | 104427144 A | 3/2015 |
| CN | 105491256 A | 4/2016 |
| CN | 105957520 A | 9/2016 |
| CN | 106210368 A | 12/2016 |
| CN | 106571148 A | 4/2017 |
| CN | 106782593 A | 5/2017 |
| WO | 2019076328 A1 | 4/2019 |

OTHER PUBLICATIONS

International Search Report in PCT/CN2018/110759 dated Jan. 4, 2019, 4 pages.
Written Opinion in PCT/CN2018/110759 dated Jan. 4, 2019, 5 pages.
First Office Action in Chinese Application No. 201710976291.1 dated Apr. 23, 2019, 11 pages.
The Extended European Search Report in European Application No. 18869142.2 dated Sep. 16, 2020, 7 pages.

* cited by examiner

Signal filter 300

First analysis filter bank 310

Second analysis filter bank 320

Adaptive filter bank 330

Controller 340

Storage module 350

Obtaining a near-end signal $D(n)$ and a far-end signal $X(n)$, wherein the near-end signal $D(n)$ may include $M$ near-end sub-band signals $d_i(n)$, the far-end signal $X(n)$ may include $M$ far-end sub-band signals $x_i(n)$, $n$ may be the sampling time point of the signal, $i$ may be a sub-band index, $i = 0, 1, ..., M-1$ ⸺ 810

Filtering, for each sub-band of the $M$ sub-bands, based on the corresponding far-end sub-band signal $x_i(n)$, the corresponding near-end sub-band signal $d_i(n)$ to generate an error signal $e_i(n)$ corresponding to the sub-band ⸺ 820

Combining the error signals $e_i(n)$ corresponding to the $M$ sub-bands to generate a combined error signal $ec(n)$ ⸺ 830

Obtaining an echo-cancelled near-end signal $E(n)$ by frequency-to-time transforming the combined error signal $ec(n)$.
During the processing of the near-end signal $D(n)$ and the far-end signal $X(n)$, detecting, according to a preset period, for each sub-band of the M sub-bands, the correlation between the near-end sub-band signal $d_i(n)$ and the far-end sub-band signal $x_i(n)$.
In response to a detection that, for the $N$ consecutive periods, the sub-band indexes corresponding to the highest correlations between the near-end sub-band signals $d_i(n)$ and the far-end sub-band signals $x_i(n)$ are all lower than K, stopping filtering of the near-end sub-band signals $d_i(n)$ corresponding to the sub-band indexes between $K$ and $M$-1, wherein $K \le M$-1 ⸺ 840

FIG. 8

METHODS AND SYSTEMS FOR OPERATING A SIGNAL FILTER DEVICE

CROSS REFERENCE

This application is a continuation of International Application No. PCT/CN2018/110759, filed on Oct. 18, 2018, which claims priority of Chinese Application No. 201710976291.1 filed on Oct. 19, 2017, the entire contents of which are hereby incorporated by reference.

TECHNICAL FIELD

The present disclosure generally relates to methods and systems for filtering signals, and particularly relates to methods and systems for operating a signal filter device for echo cancellation.

BACKGROUND

In an acoustic communication system, generally, echoes may be generated due to the coupling between a speaker and a microphone. That is, when the speaker plays a far-end input signal, a portion of the far-end input signal may be captured by the near-end microphone and be mixed into a near-end input signal, causing the near-end input signal to include echoes.

Existing echo cancellation system may perform an echo cancellation on the near-end input signal via a main process including: simultaneously transmit the far-end input signal to be transmitted to the speaker and the near-end input signal into an adaptive filter bank. The adaptive filter bank may perform a computation on the far-end input signal to estimate the echo signal in the near-end input signal, and then filter out the estimated echo signal from the near-end input signal.

One adaptive filter in the echo cancellation system processes only one input signal corresponding to one sub-band at a time. The greater the number of sub-bands the system divides the input signal into, the greater the number of corresponding adaptive filters is, and the stronger the ability of the system is to process the echoes. Therefore, in the prior art, generally, a large number of adaptive filters may be arranged when designing the system, so that the system is able to process input signals of more sub-bands at a time, thereby expanding the usage scenario of the system. However, the greater the number of sub-bands is, the higher the computation burden of the system is, and the higher the time cost of the system is to process the echoes. As a result, a higher delay of the signal transmission between the communicating parties may be caused, and the user experience may be reduced.

SUMMARY

The present disclosure provides methods and systems for operating a signal filter device for echo cancellation, so as to solve the technical problem of high signal transmission delay in the existing echo cancellation methods.

According to an aspect of the present disclosure, a method for operating a signal filter device is provided. The signal filter device may include M adaptive filters, M first analysis filters, M second analysis filters, and a controller. M may be an integer above two. The method may include generating, by the M first analysis filters, M first sub-band signals based on an input signal. The method may also include generating, by the M second analysis filters, M second sub-band signals based on a reference signal. The method may further include adjusting, by the controller, the working states of the M adaptive filters based on correlations between the M first sub-band signals and the M second sub-band signals.

In some embodiments, the M adaptive filters may be currently working adaptive filters of the signal filter device; and the signal filter device may further include currently nonworking adaptive filters.

In some embodiments, the signal filter device may further include a first storage module. Portions of the input signal are stored in a plurality of first storage units of the first storage module, each of which corresponds to one of the M first analysis filters. The generating the M first sub-band signals based on the input signal may include, for each of the M first analysis filters: receiving, by the first analysis filter, a portion of the input signal stored in the first storage unit corresponding to the first analysis filter; and performing, by the first analysis filter, a time-to-frequency transformation on the portion of the input signal to obtain the corresponding first sub-band signal.

In some embodiments, the adjusting the working states of the M adaptive filters may include: obtaining, by the controller, for each of the M first sub-band signals, a correlation parameter indicating a correlation between the first sub-band signal and the corresponding second sub-band signal; detecting, by the controller, whether a first condition is satisfied based on the obtained correlation parameters; and in response to a detection that the first condition is satisfied, causing, by the controller, at least one target adaptive filter of the M adaptive filters to stop working.

In some embodiments, the method may further include: causing, by the controller, the first analysis filter and the second analysis filter corresponding to the at least one target adaptive filter to stop working.

In some embodiments, the method may further include, after causing the first analysis filter and the second analysis filter corresponding to the at least one target adaptive filter to stop working, updating frequency bands of one or more of remainders of the M first analysis filters and frequency bands of the corresponding second analysis filters.

In some embodiments, the obtaining, for each of the M first sub-band signals, a correlation parameter may include: receiving, by the controller, from the corresponding adaptive filter, at least part of automatically adjusted coefficients used for generating an estimated signal to be subtracted from the first sub-band signal based on at least the corresponding second sub-band signal; and computing, by the controller, the correlation parameter based on the at least part of automatically adjusted coefficients.

In some embodiments, the M first sub-band signals may correspond to M sub-band indexes ranging between 0 and M−1. The detecting whether a first condition is satisfied based on the obtained correlation parameters may include: identifying, by the controller, in each period of N consecutive periods, a first index of the M sub-band indexes corresponding to the maximum correlation parameter of the period, wherein N is an integer above 1; and detecting, by the controller, that a second condition is satisfied based on the first indexes of the N consecutive periods.

In some embodiments, the second condition may be that the first indexes of the N consecutive periods are lower than K, wherein K is an integer equal to or less than M−1; and the at least one target adaptive filter may include an adaptive filter corresponding to a sub-band index between K and M−1.

In some embodiments, K may be above a first predetermined threshold.

In some embodiments, the second condition may be that the maximum of the first indexes of the N consecutive periods is lower than M and M is above a second predetermined threshold. The at least one target adaptive filter includes the adaptive filter corresponding to the sub-band index M−1.

In some embodiments, the signal filter device may provide bidirectional audio communications between a near-end user and a far-end user. The input signal may be a near-end audio signal. The reference signal may be a far-end audio signal.

According to another aspect of the present disclosure, a signal filter device for reducing a reference signal in an input signal is provided. The signal filter device may include a bank of first analysis filters, a bank of second analysis filters, a bank of adaptive filters, and a controller. Each of the bank of first analysis filters may be configured to generate a first sub-band signal based on a portion of an input signal. Each of the bank of second analysis filters may be configured to generate a second sub-band signal based on a portion of a reference signal. The bank of adaptive filters may be configured to generate, for each of the plurality of first sub-band signals, based on at least the corresponding second sub-band signal, an estimated signal to be subtracted from the first sub-band signal. The controller may be configured to adjust working states of the bank of adaptive filters based on correlations between the first sub-band signals generated by at least some of the bank of first analysis filters and the second sub-band signal generated by the corresponding second analysis filters.

In some embodiments, to adjust the working states of the bank of adaptive filters, the controller may be configured to: obtain, for each of M first sub-band signals generated by M first analysis filters of the bank of first analysis filters, a correlation parameter indicating a correlation between the first sub-band signal and the second sub-band signal generated by the corresponding second analysis filters of the bank of second analysis filters, the M first analysis filters corresponding to M working adaptive filters of the bank of adaptive filters, wherein M is an integer above two; detect whether a first condition is satisfied based on the obtained correlation parameters; and in response to a detection that the first condition is satisfied, causing, by the controller, at least one target adaptive filter of the M working adaptive filters to stop working.

According yet to another aspect of the present disclosure, a non-transitory computer readable medium is provided. The non-transitory computer readable medium may store instructions. The instructions, when executed by a processor, may cause the processor to execute operations. The operations may include: obtaining, for each of M first sub-band signals generated by M first analysis filters, a correlation parameter indicating a correlation between the first sub-band signal and a second sub-band signal generated by a corresponding second analysis filters, the M first analysis filters corresponding to M working adaptive filters, wherein M is an integer above two. The operations may also include detecting whether a first condition is satisfied based on the obtained correlation parameter. The operations may further include, in response to a detection that the first condition is satisfied, causing at least one target adaptive filter of the M working adaptive filters to stop working.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTIONS OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 3 is a schematic diagram illustrating an exemplary signal filter according to some embodiments of the present disclosure;

FIG. 8 is a flowchart illustrating an exemplary echo cancellation process according to some embodiments of the present disclosure.

DETAILED DESCRIPTION

The present disclosure relates to methods and systems for operating a signal filter device for performing the echo cancellation. The signal filter device may include filter banks whose working states are automatically and dynamically adjustable, so that the time delay of the signal filtering performed by such a signal filter device may be reduced.

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "unit," "module," and/or "block" used herein are one method to distinguish different components, elements, parts, section or assembly of different level in ascending order. However, the terms may be displaced by another expression if they achieve the same purpose.

Generally, the word "module," "sub-module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts.

Figure 2:
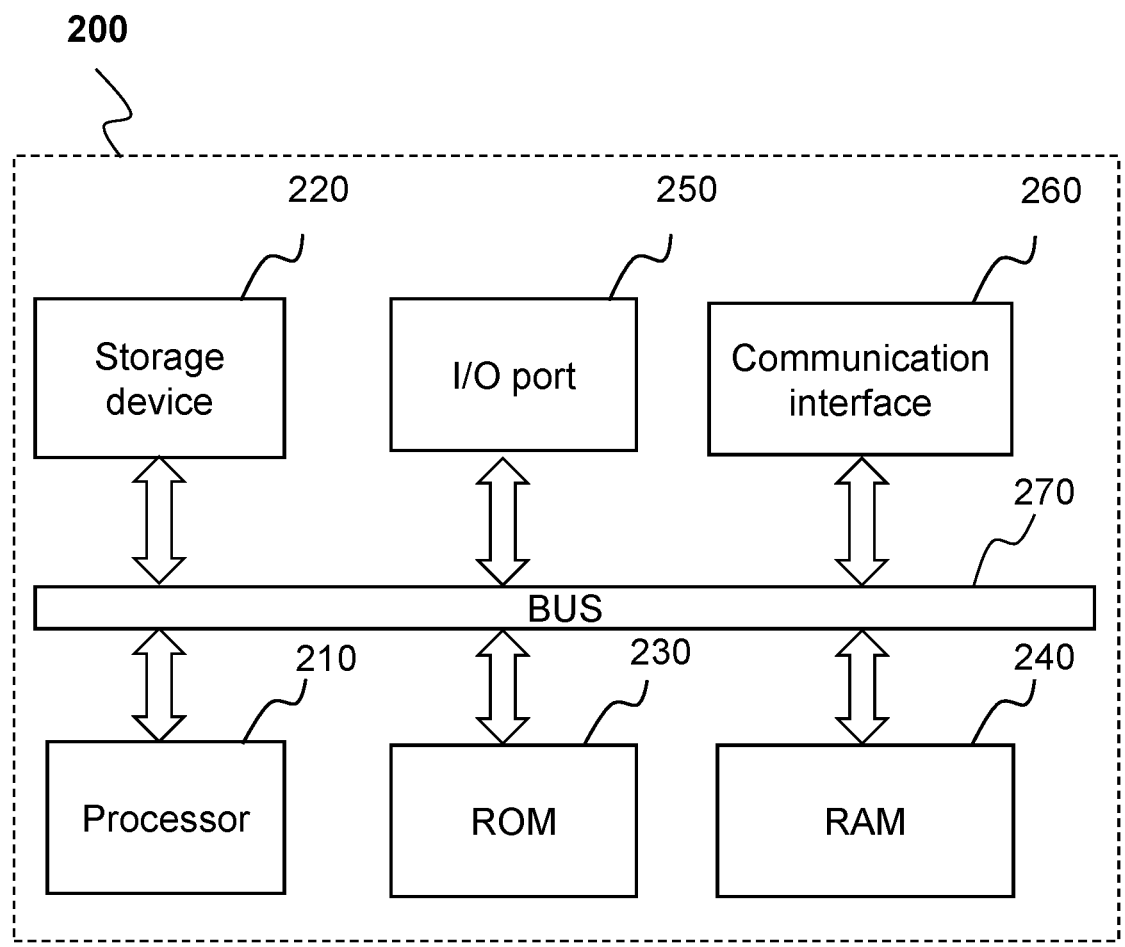
FIG. 2 is a schematic diagram illustrating an exemplary computing device.

Software modules/units/blocks configured for execution on computing devices or logical circuits (e.g., processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure.

Figure 1:
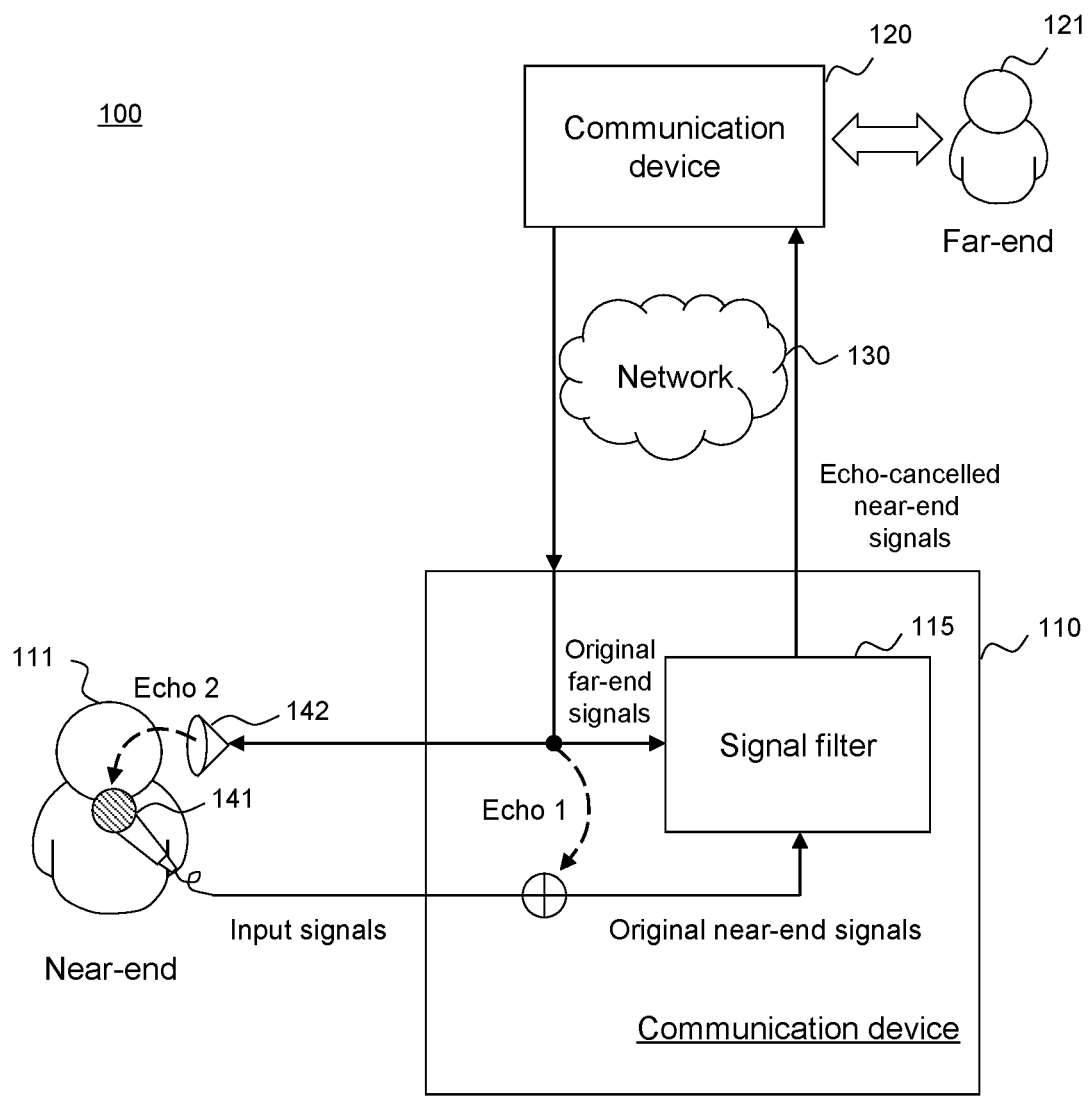
FIG. 1 is a schematic diagram illustrating an exemplary communication system according to some embodiments of the present disclosure.

FIG. 1 is a schematic diagram illustrating an exemplary communication system 100 according to some embodiments of the present disclosure. The communication system 100 may include a communication device 110, a communication device 120, and a network 130. The communication system 100 may further include other components not illustrated in FIG. 1.

The communication device 110 may communicate with the communication device 120 via the network 130 for communicating information such as acoustic information, so as to provide a bidirectional communication (e.g., a voice communication) for a user 111 and a user 121. For example, the communication device 110 may communicate audio signals and any other accompany signals (e.g., video signals) with the communication device 120.

In some embodiments, the communication device 110 and/or the communication device 130 may be a terminal device capable of providing communication related functions. For example, the terminal device may include a mobile computing device, a tablet computer, a laptop computer, a smart home device (not shown), a desktop computer (now shown), or the like, or any combination thereof. In some embodiments, the mobile computing device 141 may include a wearable device, a mobile phone, a walkie-talkie, a virtual reality device, an augmented reality device, a personal digital assistance (PDA), a navigation device, or the like, or any combination thereof.

In some embodiments, to initiate a communication to the communication device 120, the user 111 may input identification information (e.g., phone numbers, IP address, identity numbers) of the communication device 120 or the user 121 into the communication device 110. Such identification information may be used for building a communication connection between the communication device 110 and the communication device 120 by, e.g., the communication device 110, or one or more servers (or switching centers) of a communication service provider (not shown in FIG. 1).

The network 130 may include any suitable network that may facilitate a communication between the components of the communication system 100. The network 130 may be and/or include one or more types of networks. For example, the network 130 may be and/or include a public network (e.g., the Internet), a private network (e.g., a local area network (LAN), a wide area network (WAN)), a wired network (e.g., an Ethernet network), a wireless network (e.g., an 802.11 network, a Wi-Fi network), a cellular network (e.g., a Long Term Evolution (LTE) network), a frame relay network, a virtual private network ("VPN"), a satellite network, a Bluetooth™ network, a ZigBee™ network, a near field communication (NFC) network, a telephone network such as public switched telephone network (PSTN), or the like, or any combination thereof. The network 130 may also include wired and/or wireless network access points, such as base stations, internet exchange points, routers, hubs, gateways, switches, server computers, and/or any combination thereof.

In some embodiments, the network 130 may be a telephone network (e.g., PSTN), and the bidirection communication over the network 130 may be a phone call.

In some embodiments, the network 130 may be an internet protocol (IP) network (e.g., the internet), and the bidirection communication over the network 130 may be achieved using, for example, a voice over internet protocal (VoIP).

During the bidirectional communication, echoes may be mixed into the audio signals inputted by the user 111 and the user 112. The communication device 110 and/or the communication deice 120 may perform an echo cancellation process (i.e., to reduce echoes in the audio signals) in the present disclosure to reduce an echo mixed in the audio signals. For demonstration purposes and simplicity, the echo cancellation may be described in detail as following with reference to the communication device 110 and in the view of the user 111. For example, in the view of the user 111, the communication device 110 may be considered as a near-end (or local) communication device, and the communication device 120 at the other end may be considered as a far-end communication device. Correspondingly, signals received from the communication device 120 and any downstream signals thereof may be referred to as far-end signals, while signals to be transmitted to the communication device 120 and any upstream signals thereof may be referred to as near-end signals. The far-end signals, the near-end signals, as well as any other signals referred to in the present disclosure, may be digital signals or analog signals, and may be converted between digital signals and analog signals by an analog-to-digital converter (ADC) or a digital-to-analog converter (DAC) not illustrated in FIG. 1.

The near-end signals may include valid signals to be transmitted to the communication device 120 for the bidirectional communication, such as audio signals inputted by the user 111 (or be referred to as input signals) via, e.g., a microphone 141. However, due to various reasons, the near-end signals may also include echoes. For example, circuits of the communication device 110 for receiving far-end signals and transmitting near-end signals may be electrically coupled, forming an echo path between the circuits. Then the far-end signals may pass through the echo path to generate an echo, which may be mixed into the near-end signals. Such an echo may be referred to as a line echo (e.g., Echo 1 illustrated in FIG. 1). As another example, audio content included in the far-end signals may be decoded (by a decoder not shown in FIG. 1) and then played to the user 111 via a speaker 142. However, the played audio content may also be acquired by the microphone 141, causing the input signals also include the audio content of the far-end signals with a delay, causing an acoustic echo (e.g., Echo 2 illustrated in FIG. 2). It is understood that, the echo cancellation process described in the present disclosure may be adopted by the communication device 110 to reduce both line echoes and acoustic echoes, and the term "echo" as used herein may referred to echo of any type, unless otherwise noted. For demonstration purposes and not intended to be limiting, the present disclosure is described with reference to the cancellation of line echoes.

The communication device 110 may include a signal filter 115 to perform the echo cancellation. The signal filter 115 may receive a far-end signal and a near-end signal as at least part of its inputs, and perform the echo cancellation on the near-end signal according to the far-end signal to output an echo-cancelled near-end signal. In some embodiments, the signals directly received from the communication device 120 may be preprocessed (e.g., by an ADC, by a decoder) before serving as the input of the signal filter 115. The echo-cancelled near-end signal may then be transmitted to the communication device 120 via the network 130 or be further processed by any other component (e.g., a DAC, an encoder) of the communication device 110 to generate the signal to be transmitted to the communication device 120.

For the simplicity of description, the near-end signals and the far-end signals to be inputted into the signal filter 115 for signal filtering may be referred to as original near-end signals and original far-end signals.

Figure 5:
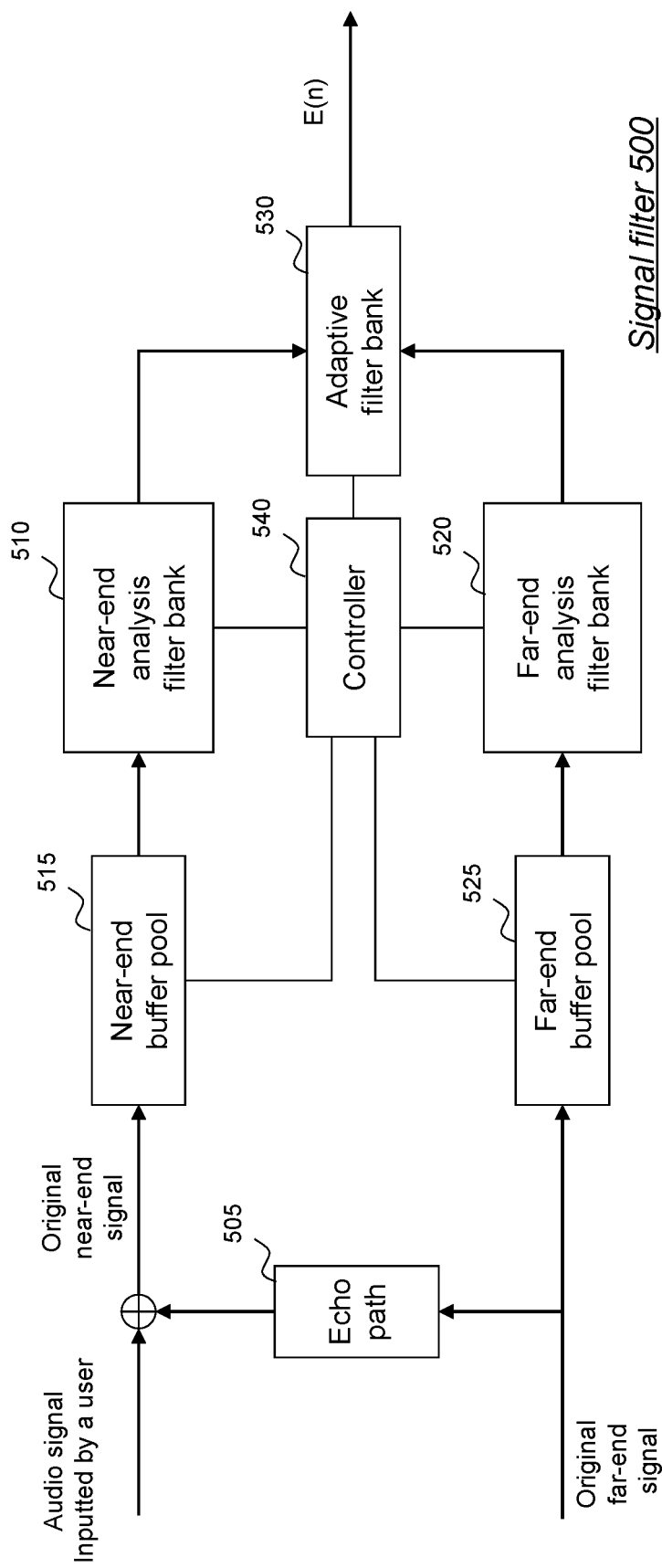
FIG. 5 is a schematic diagram illustrating an exemplary signal filter according to some embodiments of the present disclosure.
Figure 7:
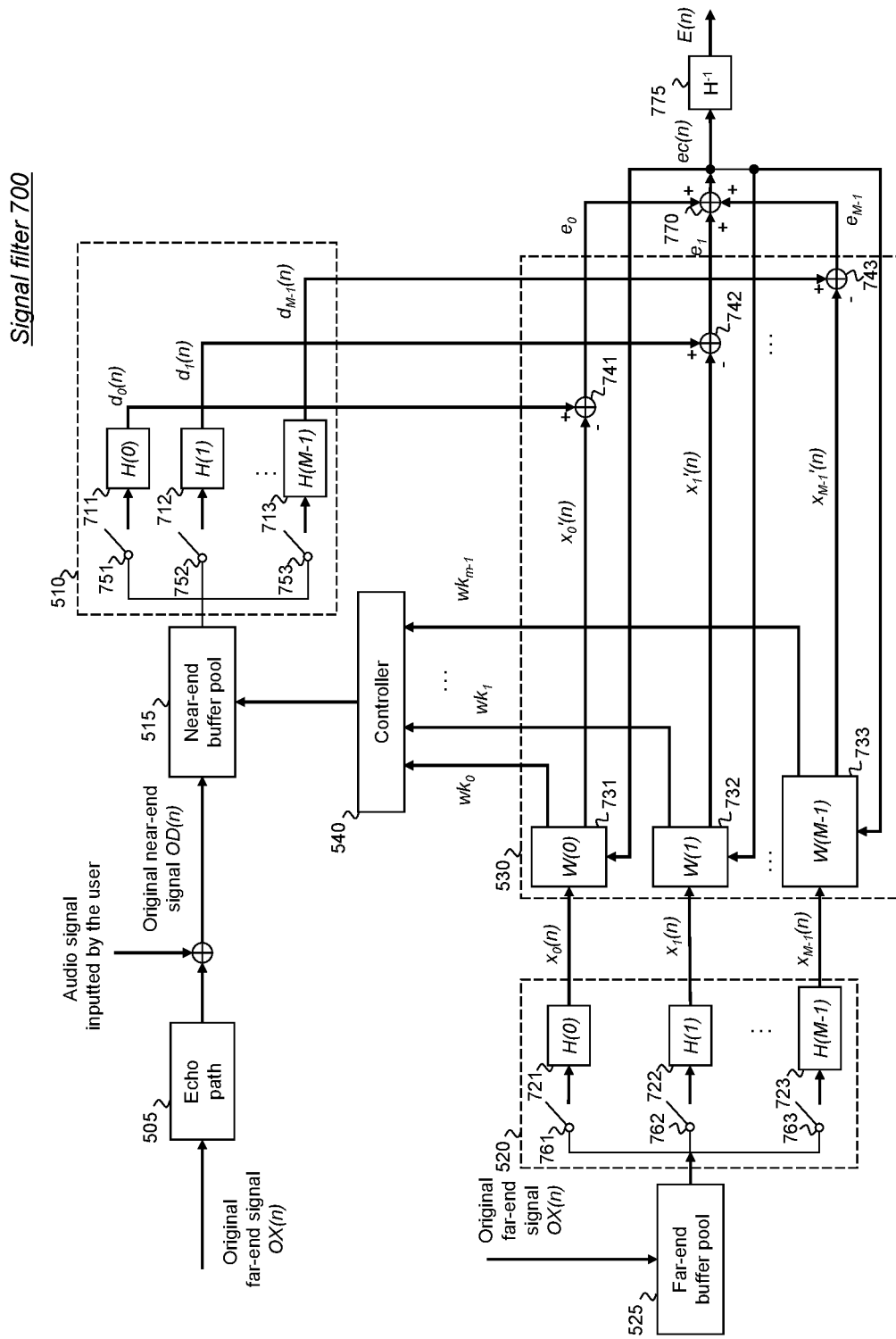
FIG. 7 is a schematic diagram illustrating an exemplary structure of the signal filter illustrated in FIG. 5 according to some embodiments of the present disclosure.

The signal filter 115 may be implemented by software or by hardware circuits. For example, the signal filter 115 may be implemented by a processor of a computing device (e.g., as illustrated in FIG. 2) by executing instructions related to an echo cancellation process described in the present disclosure. As another example, the signal filter 115 may be implemented by hardware circuits, e.g., as illustrated in FIG. 5 or FIG. 7, or an embodiment thereof.

It is noted that above descriptions about the communication system 100 are merely for illustration purposes, and not intended to limit the scope of the present disclosure. It is understandable that, after learning the major concept and the mechanism of the present disclosure, a person of ordinary skills in the art may alter the communication system 100 in an uncreative manner. The alteration may include combining and/or splitting certain devices/components/modules/units, adding or removing optional devices/components/modules/units, changing the connection state of the devices/components/modules/units, applying the communication system 100 in a relative field, or the like, or any combination thereof. All such modifications are within the scope of the present disclosure.

FIG. 2 is a schematic diagram illustrating an exemplary computing device. Computing device 200 may be configured to implement the communication device 110 and/or the signal filter 115, and perform one or more operations disclosed in the present disclosure. The computing device 200 may be configured to implement various modules, units, and their functionalities described in the present disclosure.

The computing device 200 may include a bus 270, a processor 210 (or a plurality of processors 210), a read only memory (ROM) 230, a random access memory (RAM) 240, a storage device 220 (e.g., massive storage device such as a hard disk, an optical disk, a solid-state disk, a memory card, etc.), an input/output (I/O) port 250, and a communication interface 260. It may be noted that, the architecture of the computing device 200 illustrated in FIG. 2 is only for demonstration purposes, and not intended to be limiting. The computing device 200 may be any device capable of performing a computation.

The bus 270 may couple various components of computing device 200 and facilitate transferring of data and/or information between them. The bus 270 may have any bus structure in the art. For example, the bus 270 may be or may include a memory bus and/or a peripheral bus. The I/O port 250 may allow a transferring of data and/or information between the bus 270 and one or more other devices (e.g., a touch screen, a keyboard, a mouse, a microphone, a display, a speaker). The communication interface 260 may allow a transferring of data and/or information between the network 130 and the bus 270. For example, the communication interface 260 may be or may include a network interface card (NIC), a Bluetooth™ module, an NFC module, etc.

The ROM 230, the RAM 240, and/or the storage device 220 may be configured to store instructions that may be executed by the processor 210. The RAM 240, and/or the storage device 220 may also store data and/or information generated by the processor 210 during the execution of the instruction.

The processor 210 may be or include any processor in the art configured to execute instructions stored in the ROM 230, the RAM 240, and/or the storage device 220, so as to perform one or more operations or implement one or more modules/units disclosed in the present disclosure. Merely by way of example, the processor 210 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

In some embodiments, one or more of the components of the computing device 200 may be implemented on a single chip. For example, the processor 210, the ROM 230, and the RAM 240 may be integrated into a single chip.

In some embodiments, the computing device 200 may be a single device or include a plurality of computing devices having a same or similar architecture as illustrated in FIG. 2. In some embodiments, the computing device 200 may implement a personal computer (PC) or any other type of work station or terminal device. The computing device 200 may also act as a server if appropriately programmed.

FIG. 3 is a schematic diagram illustrating an exemplary signal filter 300 according to some embodiments of the present disclosure. The signal filter 300 may filter an input signal according to a reference signal, so as to reducing a sub-signal of the input signal similar to the reference signal or caused by the reference signal. In some embodiments, the signal filter 300 may be used as the signal filter 115 illustrated in FIG. 1 to perform an echo cancellation on an input signal (e.g., an original near-end signal including an echo) with respect to a reference signal (e.g., an original far-end signal causing the echo). The signal filter 300 may include a first analysis filter bank 310, a second analysis filter bank 320, an adaptive filter bank 330, and a controller 340. In some embodiments, the signal filter 300 may further include at least one storage module 350 (optional). One or more of the components of the signal filter 300 may be hardware circuits or software modules.

The signal filter 300 may also include other components not illustrated in FIG. 3. For example, the signal filter 300 may further include one or more storage devices including one or more buffer pools for storing or buffering the input signal and/or the reference signal.

The first analysis filter bank 310 may be configured to generate a plurality of first sub-band signals based on the input signal, and the second analysis filter bank 320 may be configured to generate a plurality of second sub-band signal based on the reference signal. The input signal and the reference signal may be in the time domain or in the frequency domain. The first sub-band signals and the second sub-band signals may be in the frequency domain. The plurality of first sub-band signals and the plurality of second sub-band signals may correspond to a plurality of sub-bands. Each sub-bands may correspond to a certain range of frequency. If a first sub-band signal and a second sub-band signal are in substantially the same sub-band, the first sub-band may be referred to as corresponding to the second sub-band signal. The bandwidth of the input signal or the reference signal may be the same or different. The sub-bands may together cover the whole bandwidth of the input signal/reference signal or only a part thereof (e.g., a full frequency band, a vocal frequency band between 400 Hz and 1.6 KHz, a musical frequency band between 20 Hz and 16 KHz). The sub-bands may have equal or different bandwidths. Two of the sub-bands may be partially overlapped, continuous, or separated.

The adaptive filter bank 330 may be configured to generate, for each of the second sub-band signals, an estimated signal. The generated estimated signals may mimic the sub-signal (e.g., echo) similar to or caused by the reference signal and be subtracted from the corresponding first sub-band signals for generating error signals. The error signals may be combined to generate a combined error signal, which may then be subjected to a frequency-to-time transformation to generate a processed signal in time domain. The subtraction, combination, and/or transformation may be performed by the adaptive filter bank 330 or another component of the signal filter 300 not illustrated in the FIG. 3.

The first analysis filter bank 310 may include a bank of first analysis filters, the second analysis filter bank 320 may include a bank of second analysis filters, and the adaptive filter bank 330 may include a bank of adaptive filters. The bank of first analysis filters may correspond to the bank of second analysis filters. In some embodiments, the bank of first analysis filters, the bank of second analysis filters and the bank of adaptive filters may correspond to the plurality of sub-bands. A first/second analysis filter may output a first/second sub-band signal of a corresponding sub-band by filtering a signal passing through it. An adaptive filter may receive the second sub-band signal as at least part of its input and output a corresponding estimated signal or error signal. In some embodiments, the adaptive filter may also receive a previously generated combined error signal and/or a previously outputted error signal of the corresponding sub-band as another part of its input.

In some embodiments, an adaptive filter may include a plurality of automatically adjusted coefficients used for generating, based on at least the corresponding second sub-band signal, the corresponding estimated signal. During the generation of the estimated signal, the automatically adjusted coefficients may be updated by performing a normalized least mean squares (NLMS) algorithm (or any other proper algorithms) on the corresponding second sub-band signal and the previously outputted combined error signal.

The bank of first analysis filters, the bank of second analysis filters, and the bank of adaptive filters described above may be physical circuits or logic modules. In some embodiments, one of the bank of first analysis filters may be the same as or similar to the corresponding one of the bank of second analysis filters.

In some embodiments, the bank of first analysis filters and/or the bank of second analysis filters may be Discrete Fourier Transform (DFT) filters. Using a bank of DFT filters to generate a series of sub-band signals (e.g., the first/second sub-band signal) is known in the art, and not repeated herein. Other sub-band techniques may also be adopted herein for generating the first sub-band signals and the second sub-band signals.

In some embodiments, the signal filter 300 may be used for performing an acoustic echo cancellation (AEC) on a near-end signal (e.g., as the input signal) based on a far-end signal (e.g., as the reference signal), as illustrated in FIG. 1. The aforementioned processed signal may be the echo-cancelled near-end signal, or be used to generate the echo-cancelled near-end signal.

The controller 330 may be configured to adjust the working states of the adaptive filters of the adaptive filter bank 330. A working adaptive filter may be normally functioning, while a non-working adaptive filter may be switched-off or standby. In some embodiments, the controller 330 may physically adjust the working states of the adaptive filters by switching on or off the power supply of one or more of them. In some embodiments, the controller 330 may programmably adjust the working states of the adaptive filters by setting (or labelling) one or more of them as "working" and "nonworking" without directly controlling their power supply.

For simplicity, in the present disclosure, the term "turn on" and "turn off" may be used to refer to any physical or programmable operations for causing an adaptive filter (or any other components such as the a first analysis filter and a second analysis filter) to be working and non-working, respectively.

In some embodiments, the controller 330 may be configured to adjust the working states of the first analysis filters of the first analysis filter bank 310 and the second analysis filters of the second analysis filters of the second analysis filter bank 320. A working first/second analysis filter may receive the input/reference signal and generate the first/second sub-band signal of the corresponding sub-band, while a non-working first/second analysis filter may be switched-off or standby. The controller 330 may physically or programmably adjust the working states of the first/second analysis filters by turning on or turning off one or more of them.

Figure 4:
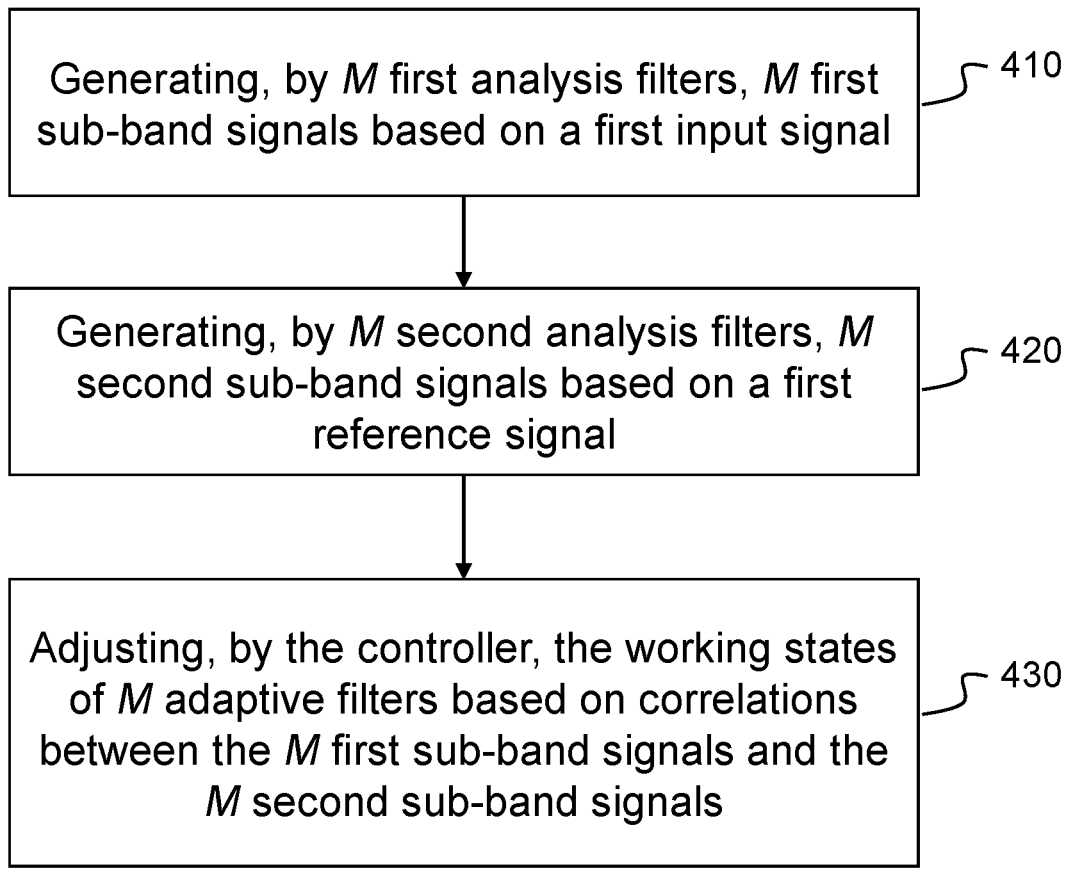
FIG. 4 is a flowchart illustrating an exemplary process for operating the signal filter illustrated in FIG. 3 according to some embodiments of the present disclosure.

In some embodiments, the controller 330 may adjust the working state of the first analysis filters and the second analysis filters via a process as illustrated in FIG. 4.

The at least one storage module 350 may include a first buffer pool and/or a second buffer pool. The first buffer pool may buffer the input signal. The second buffer pool may buffer the reference signal. The first/second buffer pool may include a plurality of storage units, each of which may store a portion of the input/reference signal. A stored portion of the input/reference signal may include one or more sampled points of the input/reference signal.

In some embodiments, the at least one storage module 350 may include an electronic component that includes both the first buffer pool and the second buffer pool.

In some embodiments, the at least one storage module 350 may include a first electronic component including the first buffer pool, and a second electronic component including the second buffer pool.

In some embodiments, the controller 340 may be a component installed (e.g., physically, programmably) in the signal filter 300 for controlling the first analysis filter bank 310, the second analysis filter bank 320, the adaptive filter bank 330, and/or the storage module 350 (if any). Without the controller 340, the other components of the signal filter 350 may also be normally functioning, but the working states of the first analysis filter bank 310, the second analysis filter bank 320, and/or the adaptive filter bank 330 may not be automatically and dynamically adjustable.

Figure 6:
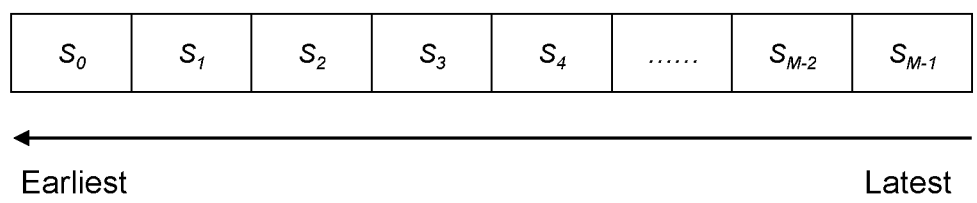
FIG. 6 is a schematic diagram illustrating an exemplary buffering of an original near-end/far-end signal by a near-end/far-end buffer pool according to some embodiments of the present disclosure.

Embodiments of the signal filter 300 are illustrated in FIGS. 5 and 6, which are only for demonstration purposes and not intended to be limiting.

It is noted that, the above descriptions about the signal filter 300 are only for illustration purposes, and not intended to limit the present disclosure. It is understood that, after learning the major concept and the mechanism of the present disclosure, a person of ordinary skills in the art may alter the signal filter 300 in an uncreative manner. The alteration may include combining and/or splitting components, adding or removing optional components, etc. For example, the adaptive filter bank 330 and the controller 340 may be combined in some embodiments. As another example, the first analysis filter bank 310, the second analysis filter bank 320, and/or the adaptive filter bank 330 may be split according to the plurality of sub-bands in some embodiments. All such modifications are within the protection scope of the present disclosure.

FIG. 4 is a flowchart illustrating an exemplary process 400 for operating the signal filter 300 illustrated in FIG. 3 according to some embodiments of the present disclosure. The process 400 may be performed for controlling the working states of the adaptive filters of the adaptive filter bank 330. In some embodiments, one or more operations of the process 400 illustrated in FIG. 4 may be implemented in the communication system 100 illustrated in FIG. 1. For example, one or more operations of the process 400 illustrated in FIG. 4 may be stored in a storage device (e.g., the RAM 240, the storage device 220) in the form of instructions, and invoked and/or executed by one or more processors (e.g., the processor 210) implementing the corresponding module of the signal filter 300.

In 410, M first analysis filters of the first analysis filter bank 310 may generate M first sub-band signals based on an input signal. M may be an integer above two. In 420, M second analysis filters of the second analysis filter bank 320 may generate M second sub-band signals based on a reference signal. The operation 410 and 420 may be performed in any sequence or be performed simultaneously.

M may be the number of currently working adaptive filters of the signal filter 300. M may be any integer between two and the total number of the adaptive filters (including working and non-working adaptive filters) of the signal filter 300. The M first analysis filters and the M second analysis filters may correspond to the M currently working adaptive filters. In some embodiments, the number of the currently working first analysis filters and/or the number of the currently working second analysis filters may be equal to or larger than M. For example, the signal filter 300 may include currently working first analysis filters and/or currently working second analysis filters corresponding to the currently non-working adaptive filter. The total number of the first analysis filters may be equal to the total number of the second analysis filters, and may be equal to or larger than the total number of the adaptive filters (including working and non-working adaptive filters).

In some embodiments, M may be the total number of the adaptive filters at the very beginning of a bidirectional communication, in which case the total number of the adaptive filters are working.

The M first sub-band signals and the M second sub-band signals may correspond to M sub-bands. In some embodiments, the M sub-bands may belong to a series of predetermined sub-bands, which may correspond to all the first/second analysis filters in the signal filter 300. In some embodiments, the M sub-bands may be dynamically adjusted based on the number M.

The M sub-bands may be designated with M sub-band indexes ranging between, for example, 0 and M−1. The M first sub-band signals may be designated with M sub-band indexes ranging between, for example, 0 and M−1. In some embodiments, the sub-band corresponding to the index 0 may be the sub-band of the lowest frequency, and the sub-band corresponding to the index M−1 may be the sub-band of the highest frequency. Alternatively, in some embodiments, the sub-band corresponding to the index 0 may be the sub-band of the highest frequency, and the sub-band corresponding to the index M−1 may be the sub-band of the lowest frequency.

In some embodiments, the input signal and the reference signal may be a sample (e.g., a portion) of the near-end signal and a sample (e.g., a portion) of the far-end signal as described in connection with FIG. 1, respectively.

The M first sub-band signals may be obtained based on the same portion of the near-end signal or different portions of the near-end signal. In some embodiments, the M first analysis filters may process the same portion of the near-end signal to generate the M first sub-band signals. In some embodiments, different filters of the M first analysis filters may process different portions of the near-end signal to generate the M first sub-band signals. For example, a sample of the near-end signal may be divided into M portions (in the time domain), each of which may be processed by a corresponding one of the M analysis filters to generate a corresponding first sub-band signal in the frequency domain. Thus, the M portions may correspond to the M sub-bands, respectively. The generation of the M second sub-band signals may be the same as or similar to the generation of the M first sub-band signals.

In 430, the controller 340 may adjust the working states of the M adaptive filters based on correlations between the M first sub-band signals and the M second sub-band signals of the signal filter 300. The term "correlation" may refer to a measure of similarity between two signals (e.g., cross-correlation). A high correlation between a first sub-band signal and a corresponding second sub-band signal may indicate that a sub-signal of the input signal similar to or caused by the reference signal has a main component in the corresponding sub-band (or frequency band).

In some embodiments, the controller 340 may obtain, for each of the M first sub-band signals (or the M corresponding sub-bands), a correlation parameter indicating a correlation between the first sub-band signal and the corresponding second sub-band signal. The controller 340 may detect whether a first condition is satisfied based on the obtained correlation parameters. In response to a detection that the first condition is satisfied, the controller 340 may cause at least one target adaptive filter of the M adaptive filters to stop working (e.g., physically or programmably). The at least one target adaptive filter may be the adaptive filter(s) determined as having lower contribution on signal filtering. The first/second analysis filter(s) corresponding to the at least one target adaptive filter may continue working or also be caused to stop working.

In some embodiments, the controller 340 may receive, from the corresponding adaptive filter, at least part of automatically adjusted coefficients used for generating the estimated signal to be subtracted from the first sub-band signal based on at least the corresponding second sub-band signal, and compute the correlation parameter based on the at least part of automatically adjusted coefficients. For example, the correlation parameter may be or be based on the sum of the squares of the at least part of automatically adjusted coefficients.

In some embodiments, the first condition may be related to a distribution pattern of the obtained correlation parameters. For example, the first condition may include that the distribution pattern of the obtained correlation parameters satisfies a template distribution pattern, a certain feature of the distribution pattern satisfies a predetermined criterion, or the like, or a combination thereof.

In some embodiments, the controller 340 may periodically obtain the correlation parameters of the M sub-bands. The controller 340 may detect whether the first condition is satisfied based on the obtained correlation parameters via a process including: identifying, in each period of N consecutive periods, a first index of the M sub-band indexes corresponding to the maximum correlation parameter of the period, wherein N is an integer above 1; and detecting whether a second condition is satisfied based on the first indexes of the N consecutive periods. The second condition may be related to the distribution pattern of the first indexes of the N consecutive periods.

In some embodiments, the second condition may be that the first indexes of the N consecutive periods are lower than K, wherein K is an integer equal to or less than M−1. When such a second condition is satisfied, the sub-signal of the input signal similar to or caused by the reference signal may be determined as having less component in the sub-bands having the indexes between K and M−1, and the adaptive filters corresponding to the sub-band indexes between K and M−1 may be determined as having less contribution on signal filtering compared to other adaptive filters. Thus, the at least one target adaptive filters may include the adaptive filters corresponding to sub-band indexes between K and M−1. In some embodiments, K may be above a first predetermined threshold.

In some embodiments, the second condition may be that the maximum of the first indexes of the N consecutive periods are lower than M, while M is above a second predetermined threshold. Similarly, when such a second condition is satisfied, the adaptive filter corresponding to the sub-band index M−1 may be determined as having less contribution on signal filtering compared to other adaptive filters. Thus, the at least one target adaptive filters may include the adaptive filter corresponding to the sub-band frequency index M−1.

In some embodiments, each of the adaptive filters may be a physical circuit including a physical switch (e.g., a transistor, a gate circuit). The physical switch may control the power flow and/or the data flow to the corresponding adaptive filter. The controller 330 may transmit control signals to such a switch to switch on or switch off the switch, so as to turn on or turn off the corresponding adaptive filter.

In some embodiments, the adaptive filters may be implemented by a programmed processor (e.g., the processor 210), the controller 330 (implemented by the same processor or another processor) may transmit data to re-program the processor, so as to increase or decrease the number of the adaptive filters, which may also be viewed as an adjustment of the working state of the adaptive filters.

In some embodiments, in response to the detection that the first condition is satisfied, the controller 340 may further cause the first analysis filter and the second analysis filter corresponding to the at least one target adaptive filter to stop working.

In some embodiments, after the first analysis filter and the second analysis filter are caused to stop working, the frequency bands of one or more first analysis filters of the remainders of the M first analysis filters and the frequency bands of the corresponding second analysis filters may be updated accordingly (i.e., the frequency bands of one or more of the remainders of the M sub-bands are updated), such that the total frequency band may be unchanged.

In some embodiments, the process 400 may be repeated in cycles to gradually adjust the working states of the adaptive filters of the adaptive filter bank 330. For example, the total numbers of the working first analysis filters, the working second analysis filters, and the working adaptive filters may all be T (T≥M) initially. In the first cycle, M may be equal to T, and by performing the process 400, the controller 340 may turn off $L_1$ ($L_1$≥1) target adaptive filters. Then in the second cycle, M may be updated to T−$L_1$, and by performing the process 400, the controller 340 may turn off $L_2$ ($L_2 \geq 1$) target adaptive filters. Next in the third cycle, M may be updated to $T-L_1-L_2$ and so on.

In some embodiments, a single target adaptive filter may be turned off in each cycle when the first condition (or the second condition) is satisfied. The single target adaptive filter may correspond to the sub-band index M−1.

In some embodiments, the controller 340 may also turn on one or more currently non-working adaptive filters and/or the corresponding first/second analysis filters during a bidirectional communication. For example, the controller 340 may automatically turn on one or more of the adaptive filters (and the corresponding first/second analysis filters) according to a preset time period, or in response to a fluctuation of the near-end/far-end signal.

It is noted that, although the generation of the first/second sub-band signals is involved in both the process 400 for adjusting the working states of the adaptive filters and in the signal filtering process for reducing a component of an input signal based on a reference signal, the manner of the generation of the first/second sub-band signals in the process 400 for adjusting the working states of the adaptive filters may not be necessarily the same as the manner of the generation of first/second sub-band signals for performing a signal filtering process on the input signal. In some embodiments, the adjustment process may be performed before the signal filtering process. In the adjustment process, different portions of the input/reference signal may be used for generating the first/second sub-band signals. Then, in the signal filtering process, a same portion of the input/reference signal may be used for generating all the first/second sub-band signals by the first/second analysis filters those are still working after the adjustment process.

It is understood that, although the process 400 and a normal signal filtering process of the signal filter 300 may both involving generating sub-band signals (first sub-band signal or second sub-band signal), the manners for generating the sub-band signals may not necessarily be the same.

In some embodiments, in the process 400, for generating the first/second sub-band signals, a sample of the input/reference signal may be divided into M portions in the time domain, and each portion may then pass through a corresponding first/second analysis filter to generate a first/second sub-band signal of the corresponding sub-band. Such a manner may improve the efficiency of the working state adjustment, but may cause a remarkable loss of information carried by the input signal. In the normal signal filtering process, the dividing of the of the input/reference signal in the time domain may not be performed, and the same signal portion of the input/reference signal may pass through all the working first/second analysis filters simultaneously for generating first/second sub-band signals. In such embodiments, the process 400 may be performed before the normal signal filtering process to reduce the computation burden and the delay of the normal signal filtering process.

In some embodiments, both in the process 400 and in the normal signal filtering process, for generating the first/second sub-band signals, the same signal portion of the input/reference signal may pass through all the working first analysis filters simultaneously for generating first/second sub-band signals. The process 400 may be performed before or during the normal signal filtering process to dynamically reduce the computation burden and the delay of the normal signal filtering process.

It should be noted that the above descriptions of the process 400 are only for demonstration purposes, and not intended to limit the scope of the present disclosure. It is understandable that, after learning the major concept of the present disclosure, a person of ordinary skills in the art may alter the process 400 in an uncreative manner. For example, the operations above may be implemented in an order different from that illustrated in FIG. 4. One or more optional operations may be added to the flowcharts. One or more operations may be split or be combined. All such modifications are within the scope of the present disclosure.

FIG. 5 is a schematic diagram illustrating an exemplary signal filter 500 according to some embodiments of the present disclosure. The signal filter 500 may be an example of the signal filter 300 as illustrated in FIG. 3. During a bidirectional communication, an original far-end signal may pass through an echo path 505 to form an echo in the original near-end signal. The signal filter 500 may filter the original near-end signal according to the original far-end signal so as to reduce the echo in the original near-end signal.

As illustrated in FIG. 5, the signal filter 500 may include a near-end analysis filter bank 510, a near-end buffer pool 515, a far-end analysis filter bank 520, a far-end buffer pool 525, an adaptive filter bank 530, and a controller 540. The controller 540 may be coupled to the near-end analysis filter bank 510, the near-end buffer pool 515, the far-end analysis filter bank 520, and the far-end buffer pool 525, and the adaptive filter bank 530, respectively.

The near-end analysis filter bank 510, the far-end analysis filter bank 520, the adaptive filter bank 530, and the controller 540 may be embodiments of the first analysis filter bank 310, the second analysis filter bank 320, the adaptive filter bank 330, and the controller 340, respectively. The near-end buffer pool 515 and the far-end buffer pool 525 may be components (e.g., the first component, the second component) of the at least one storage module 350.

It is understood that, the components of the signal filter 500 may be implemented by software or hardware circuits. The connection between the components of the signal filter 500 as illustrated in FIG. 5 may be or may include direct wired connections, indirect wired connections (e.g., connected via one or more additional components not illustrated in FIG. 5), wireless connections, and/or logic connections, or the like, or a combination thereof.

In some embodiments, the signal filter 500 may have an exemplary structure as illustrated in FIG. 7. As illustrated in FIG. 7, the near-end analysis filter bank 510 may include a plurality of near-end analysis filters (e.g., near-end analysis filters 711 to 713). The far-end analysis filter bank 520 may include a plurality of far-end analysis filters (e.g., the far-end analysis filters 721 to 723). The adaptive filter bank 530 may include a plurality of adaptive filters (e.g., the adaptive filters 731 to 733). For demonstration purposes, only currently working near-end analysis filters, far-end analysis filters, and adaptive filters are illustrated in FIG. 7.

In some embodiments, each of the plurality of near-end analysis filters, the plurality of far-end analysis filters, and/or the plurality of adaptive filters may be coupled with a switch (e.g., the switches 751 to 753, the switches 761 to 763) for turning on or turning off the filter. In some embodiments, the switches may be physical switches (e.g., a transistor, a gate circuit) for controlling the power flow and/or signal flow of the corresponding filters. In some embodiments, the switches may be virtual switches (e.g., a set of instructions) for programmably turning on or turning off the corresponding filters. The switches may be controlled by the controller 540.

In FIG. 7, although for demonstration purposes the switches are illustrated as being switched off, they are actually being switched on so that the corresponding filters are currently working. Additionally, although not illustrated in FIG. 7, each of the adaptive filters may also be coupled with a physical or virtual switch, so that one or more adaptive filters may be turned on or turned off.

The near-end buffer pool 515 may be configured to store original near-end input signals acquired by the microphone 141. The far-end buffer pool 515 may be configured to store original far-end input signals at the speaker 142. The first analysis filter bank 510 may be configured to obtain and process an original near-end signal OD(n) (input signal) to generate M near-end sub-band signals $d_i(n)$ (first sub-band signals) corresponding to M sub-bands, and transmit the sub-band signals $d_i(n)$ to the adaptive filter bank 530, wherein N is the index of the signal or the sampling time point of the signal, and i is the index of the sub-bands (e.g., 0, 1, . . . , M–1). The far-end analysis filter bank 520 may be configured to obtain and process an original far-end input signal OX(n) (reference signal) to generate M far-end sub-band signals $x_i(n)$ (second sub-band signals) corresponding to the M sub-bands, and transmit the far-end sub-band signals $x_i(n)$ to the adaptive filter bank 530. The adaptive filter bank 530 may be configured to, for each of the M sub-bands, filter the corresponding near-end sub-band signal $d_i(n)$ according to the corresponding far-end sub-band signal $x_i(n)$ to generate a corresponding error signal $e_i(n)$. The error signals $e_i(n)$ corresponding to the M sub-bands may be combined to generate a combined error signal ec(n). The combined error signal ec(n) may then be frequency-to-time transformed to obtain an echo-cancelled near-end input signal E(n) (processed signal). The controller 540 may be configured to detect, for each of the M sub-bands, the correlation between the corresponding near-end sub-band signal and the corresponding far-end sub-band signal, and dynamically turn off the adaptive filters, the near-end analysis filters, and/or the far-end analysis filters corresponding to some of the sub-bands.

In some embodiments, each adaptive filter of the adaptive filter bank 530 may be configured to generate an estimated echo signal $x_i'(n)$ (estimated signal) based on at least the corresponding far-end sub-band signal $x_i(n)$ as an estimated echo in the frequency range of the corresponding sub-band, and subtract the estimated echo signal $x_i'(n)$ from the corresponding near-end sub-band signal $d_i(n)$ to generate the corresponding error signal $e_i(n)$. Each adaptive filter may include or be coupled to a subtracter for performing the above subtracting. For demonstration purposes, the subtracters (e.g., the sub-tracters 741 to 743) may be illustrated as being coupled to the adaptive filters in FIG. 7. However, it is understood that a subtracter may also be a part of the corresponding adaptive filter.

The sizes of the near-end buffer pool 515 and the far-end buffer pool 525 may be the same or different, which is not specifically limited in embodiments of the present disclosure.

FIG. 6 is a schematic diagram illustrating an exemplary buffering of an original near-end/far-end signal by a near-end/far-end buffer pool according to some embodiments of the present disclosure. The buffer pool 600 illustrated in FIG. 6 may be a near-end buffer pool (first buffer pool) or a far-end buffer pool (second buffer pool). The buffer pool 600 may include a plurality of buffer positions (e.g., the buffer positions $S_0, S_1, \ldots, S_{M-1}$). Each buffer position or cell of the buffer pool 600 illustrated in FIG. 6 may represent one or more storage units of the at least one storage module 350.

For demonstration purposes, the buffer pool 600 may be described as a near-end buffer pool. The signal (or a portion or sample thereof) stored in the buffer position at the end of the buffer pool 600 (e.g, the left most buffer position $S_0$ in FIG. 6) may be the earliest buffered original near-end signal in the buffer pool 600, and the signal (or a portion or sample thereof) stored in the buffer position at the other end of the buffer pool 600 (e.g., the rightmost position $S_{M-1}$ in FIG. 2) may be the latest buffered signal of the original near-end signal in the buffer pool 600. The original near-end signals stored in the buffer pool 600 may be shifted from right to left over time with respect to the buffer pool 600 illustrated in FIG. 6. The buffer pool 600 may function similarly when being used as a far-end buffer pool. It should be noted that the buffer pool 600 illustrated in FIG. 6 is only for demonstration purpose, and does not limit the forms of the buffer pools in the present disclosure.

Referring back to FIG. 5, in some embodiments, the near-end analysis filter bank 510 may process the original near-end signals by: obtaining an original near-end signal OD(n) of a preset time length from the near-end buffer pool 515; dividing the obtained original near-end signal OD(n) into M portions (or be referred to as near-end signal portions) corresponding to the M sub-bands; performing a time-to-frequency transformation on each near-end signal portion to generate M near-end sub-band signals $d_i(n)$. One near-end analysis filter (first analysis filter) of the near-end analysis filter bank 510 may only process the near-end signal portion corresponding to one sub-band at a time, and may generate the near-end sub-band signal $d_i(n)$ thereby. The near-end analysis filter may then transmit the generated near-end sub-band signal $d_i(n)$ to the corresponding adaptive filter of the adaptive filter bank 530. For example, as illustrated in FIG. 7, the near-end analysis filter 711 (H(0)) may output a near-end sub-band signal $d_0(n)$ to the subtracter 741 coupled to the adaptive filter 731 (W(0)), the near-end filter 712 (H(1)) may output a near-end sub-band signal $d_1(n)$ to the subtracter 742 coupled to the adaptive filter 732 (W(1)), . . . , and the near-end analysis filter 713 (H(M–1)) may output a near-end sub-band signal $d_{m-1}(n)$ to the subtracter 743 coupled to the adaptive filter 733 (W(M–1)). The subtracters 741 to 743 may also be components of the adaptive filters 731 to 733, respectively. The function H(k) (k=1, 2, . . . , M–1) may be used to generate the M near-end sub-band signals $d_i(n)$, and the function W(k) may be used to generate the corresponding estimated signal signal $x_i'(n)$ or the error signal $e_i(n)$.

In some embodiments, the far-end analysis filter bank 520 may process the original far-end signals by: obtaining an original far-end signal OX(n) of a preset time length from the far-end buffer pool 515; dividing the obtained original far-end signal OX(n) into M portions (or be referred to as far-end signal portions) corresponding to the M sub-bands; performing a time-to-frequency transformation on each far-end signal portion corresponding to each sub-band to generate M far-end sub-band signals $x_i(n)$. Similar to the near-end analysis filter bank 510, one far-end analysis filter (second analysis filter) of the far-end analysis filter bank 520 may only process the far-end signal portion corresponding to one sub-band at a time, and may generate the far-end sub-band signal $x_i(n)$ thereby. The far-end analysis filter may then transmit the generated far-end sub-band signal $x_i(n)$ to the corresponding adaptive filter of the adaptive filter bank 530. The same function H(k) may be used by the corresponding far-end analysis filter to generate the M far-end sub-band signals $x_i(n)$. For example, as illustrated in FIG. 7, the far-end analysis filter 721 (H(0)) may output a far-end sub-band signal $x_0(n)$ to the adaptive filter 731 (W(0)), the far-end filter 722 (H(1)) may output a far-end sub-band signal $x_1(n)$ to the adaptive filter 732 (W(1)), . . . , and the far-end analysis filter 723 (H(M−1)) may output a far-end sub-band signal $x_{m-1}(n)$ to the adaptive filter 733 (W(M−1)).

In some embodiments, a Fourier transformation and/or a down-sampling operation may be involved in the generation of the near-end sub-band signals $d_i(n)$ and the far-end sub-band signals $x_i(n)$.

It should be noted that, in some embodiments of the present disclosure, the near-end/far-end analysis filter bank 510/520 may divide the original near-end/far-end signal OD(n)/OX(n) in the time domain to generate the M near-end/far-end signal portions. In some specific implementations, the original near-end/far-end signal OD(n)/OX(n) obtained from the near-end/far-end buffer pool 515/525 may be divided according to the sequence of the time of buffering (e.g., an associated timestamp). The portions of the near-end signal corresponding to different sub-bands may be buffered by the near-end buffer pool 515 at different time points, and the portions of the near-end/far-end signal corresponding to different sub-bands may be buffered by the far-end buffer pool 525 at different time points.

In some specific implementations, one buffer position of the near-end buffer pool 515 may correspond to one near-end analysis filter in the near-end analysis filter bank 510, and the portions of the original near-end signal OD(n) acquired by different near-end analysis filters may be stored in different buffer positions of the near-end buffer pool 515. A near-end analysis filter may directly obtain the corresponding portion of the original near-end signal OD(n) from the corresponding buffer position of the near-end buffer pool 515, process the obtained signal portion to generate a corresponding near-end sub-band signal, and transmit the generated near-end sub-band signal to the corresponding adaptive filter. For example, as illustrated in FIGS. 6 and 7, the buffer position $S_0$ may correspond to the near-end analysis filter 711 (H(0)), and the buffer position $S_1$ may correspond to the near-end analysis filter 712 (H(1)), . . . , and the buffer position $S_{M-1}$ may correspond to the near-end analysis filter 713 (H(M−1)). The obtaining the portions of the original far-end signal OX(n) from the far-end buffer pool 525 may be similar to the obtaining the portions of the original near-end signal OD(n) from the near-end buffer pool 515, which is not repeated herein.

The controller 540 may detect, for each of the M sub-bands, a correlation between the corresponding near-end sub-band signal and the corresponding corresponding far-end sub-band signal. The controller 540 may also dynamically turn off some of the adaptive filters according to the detection result. In some embodiments, the M near-end sub-band signals $d_i(n)$ may form a near-end signal D(n), and the M far-end sub-band signals $x_i(n)$ may form a far-end signal X(n). During the processing of the near-end signal D(n) and the far-end signal X(n), according to a preset period, the adaptive filter bank 530 may detect, for each of the M sub-bands, the correlation between the near-end sub-band signal $d_i(n)$ and the far-end sub-band signal $x_i(n)$. In response to a detection that, for the N (N≥1) consecutive periods, the sub-band indexes (e.g., the target indexes) corresponding to the highest correlations between the near-end sub-band signals $d_i(n)$ and the far-end sub-band signals $x_i(n)$ are all lower than K, the controller 540 may turn off the adaptive filters, the near-end analysis filters, and the far-end analysis filters corresponding to the sub-band indexes between K and M−1, so that the adaptive filter bank 530 may stop filtering the near-end sub-band signals $d_i(n)$ corresponding to the sub-band indexes between K and M−1. The controller 540 may further adjust the configuration of the near-end buffer pool 515, so that the buffer positions corresponding to the near-end analysis filters may be shifted toward the end corresponding to the latest buffered signal for M-K buffer positions, so as to adjust the time delay between the near-end signal and the far-end signal processed by the adaptive filters. K may be an integer lower than or equal to M−1. M may be equal to the number of the remaining sub-bands of the signal filter 500 or 700. M may also be equal to the number of the adaptive filters/near-end analysis filters/far-end analysis filters which are currently turned on.

In some embodiments, a switch (e.g., the switches 751 to 753, the switches 761 to 763) may be set at the front-end or the rear-end of each filter, and the controller 540 may be coupled to each switch (not shown in FIG. 7). The controller 540 may switch on or switch off one or more switches to control the working states of the filters corresponding to the one or more switches.

In some embodiments, the controller 540 may be a standalone component coupled to various components of the signal filter 500 or 700 to control the whole echo cancellation process. Alternatively, the controller 540 may be a part of the adaptive filter bank 530, and control the whole echo cancellation process via the adaptive filters. Embodiments of the present disclosure do not limit the implementation of the controller 540.

In some embodiments, the combining the error signals $e_i(n)$ corresponding to all the sub-bands and the subsequent frequency-to-time transformation may be performed by the adaptive filter bank 530 itself or other components of the signal filter 500 or 700, which is not limited by embodiments of the present disclosure. For example, an adder (e.g., adder 770 in FIG. 7) may be set at the rare-end of the adaptive filter bank 530. The adder may be coupled to the output of each adaptive filter in the adaptive filter bank 530 for combining the error signals $e_i(n)$ to generate the combined error signal ec(n). As another example, a transformation module 775 may be set at the output of the adder for performing the frequency-to-time transformation (e.g., via an inverse fast Fourier transformation (IFFT)) on the combined error signal ec(n). In some embodiments, the frequency-to-time transformation may be performed via a function $H^{-1}$, which is a reverse form of the function H(k).

In some embodiments, before the error signals $e_i(n)$ are combined by the adder, each of the error signals $e_i(n)$ may be subjected to an up-sampling operation to interpolate to the original sampling rate if a down-sampling operation is involved in the generation of the near-end sub-band signals $d_i(n)$ and the far-end sub-band signals $x_i(n)$.

In the above embodiments, the signal filter 500 or 700 may determine, by detecting the correlation between the near-end sub-band signal $d_i(n)$ and the far-end sub-band signal $x_i(n)$ corresponding to each of the M sub-band, a sub-band index (the target index) corresponding to the highest correlation, so as to obtain an estimated frequency range of the major component of the echo in the near-end signal. If the obtained sub-band indexes are steadily lower than K within a predetermined time, the adaptive filter, the near-end analysis filter, and the far-end analysis filter corresponding to the sub-band indexes between K and M−1 (determined as having less contribution on echo cancellation compared to others) may be turned off to reduce the ineffective computation burden of the signal filter 500 or 700, so that the signal filter 500 or 700 may perform the echo cancellation faster. Via the signal filter operating process disclosed in the present disclosure, the numbers of working near-end analysis filters, working far-end analysis filters, and working adaptive filters may be dynamically adjusted, and the time delay of the signal transmission between two communication parties may be reduced provided that the echo is reduced. The real-time performance of the bidirectional communication between the communication parties may be improved, and the user experience may be improved.

In some embodiments, referring to FIG. 7, for each sub-band of the M sub-bands, the adaptive filter bank 530 may filter the corresponding near-end sub-band signal $d_i(n)$ and generate a corresponding error signal $e_i(n)$ via a process described as following.

The adaptive filter bank 530 may perform, for each sub-band of the M sub-bands, an NLMS algorithm (or any other proper algorithms) on the far-end sub-band signal $x_i(n)$ and a previously outputted combined error signal ec(n') to obtain a corresponding estimated echo signal $x_i'(n)$. The adaptive filter bank 530 may remove the estimated echo signal $x_i'(n)$ from the corresponding near-end sub-band signal $d_i(n)$ to obtain the corresponding error signal $e_i(n)$.

In some embodiments, the adaptive filter bank 530 may include a subtractor coupled to or included in each adaptive filters (e.g., the subtractors 741, 742, 743). The subtractor may receive the corresponding estimated echo signal $x_i'(n)$ (the output of the corresponding adaptive filter) and the corresponding near-end sub-band signal $d_i(n)$ as its input, and generate the estimated echo signal $x_i'(n)$ as the output.

Via the above approach, the reliability of the signal filter 500 or 700 may be further improved, and the performance of the echo cancellation may be better.

In some embodiments, the controller may detect, for each sub-band of the M sub-bands, the correlation between the corresponding near-end signal $d_i(n)$ and the corresponding far-end signal $x_i(n)$ by detecting the updated coefficient value of the adaptive filter. The updated coefficient value may serve as the correlation parameter described in FIG. 3.

In some embodiments, as illustrated in FIG. 7, each adaptive filter may transmit its updated coefficient value wk (the correlation parameter as described in FIG. 3) to the controller 540, so that the controller 540 may determine the sub-band index (the target index) corresponding to the highest correlation between the near-end sub-band signals $d_i(n)$ and the far-end sub-band signals $x_i(n)$ by comparing the updated coefficient values wk corresponding to each of the M sub-band. A larger updated coefficient value wk may indicate a higher correlation between the corresponding near-end sub-band signal $d_i(n)$ and the corresponding far-end sub-band signal $x_i(n)$. When the controller 540 determines that, in N (N≥1) consecutive periods, all the sub-band indexes (target indexes) corresponding to the largest updated coefficient values wk are lower than K, the controller 540 may turn off the adaptive filter, the near-end analysis filter, and the far-end analysis filter corresponding to the sub-band indexes between K and M−1, so that the adaptive filter bank 530 may stop filtering the near-end sub-band signals $d_i(n)$ corresponding to the sub-band indexes between K and M−1.

In some embodiments, an adaptive filter corresponding to a sub-band may actually include multiple updatable coefficients (e.g., the automatically adjusted coefficients as described in FIG. 3) at the same time, and the updated coefficient value wk of the adaptive filter corresponding to the sub-band may be based on all the updatable coefficients corresponding to the sub-band or at least a part of them. For example, when the adaptive filter bank 530 generate the estimated echo signals using an NLMS algorithm, the updated coefficient value of the adaptive filter corresponding to one sub-band may be the sum of the squares of all the updatable coefficients corresponding to that sub-band.

In some embodiments, the adaptive filter bank 530 may transmit at least part of the updatable coefficients to the controller 540. The controller 540 may compute the correlation parameter based on the at least part of automatically adjusted coefficients.

According to such an approach, the correlation between the near-end signal $d_i(n)$ and the far-end signal $x_i(n)$ corresponding to each sub-band may be determined by detecting the updated coefficient value of the adaptive filter corresponding to that sub-band. So that, while ensuring that the echo is reduced, the time delay of the signal transmission between two communication parties may be reduced, and the real-time performance of the in the bidirectional communication and the user experience may be improved.

In some embodiments, the total duration of the consecutive N periods may be equal to a total time length of a predetermined number of sub-bands, wherein the time length of a sub-band may be the time length for the microphone 141 to receive a corresponding near-end/far-end signal portion of the original near-end/far-end signal (used for generating the corresponding near-end/far-end sub-band signal). The predetermined number may be selected according to the actual situation, and is not specifically limited in the embodiments of the present disclosure.

For example, assuming that the number of sample points of the near-end/far-end signal portion corresponding to one sub-band is S, the N periods may be equal to the time length corresponding to S*M sample points. In some embodiments, the sample points of adjacent signal portions may be overlapped. For example, the signal portion corresponding to the sub-band 0 (index) may contain $\{x_0, x_1, x_2, x_3\}$, the signal portion corresponding to the sub-band 1 may contain $\{x_2, x_3, x_4, x_5\}$, the signal portion corresponding to the sub-band 2 may contain $\{x_4, x_5, x_6, x_7\}$, and so on. Then the duration of the N periods may be equal to the total time length of (M+1)*S/2 sub-bands.

Via the above approach, the reliability of the detection result of the correlation between the near-end signal $d_i(n)$ and the far-end signal $x_i(n)$ corresponding to each sub-band may be improved, and the performance of the echo cancellation on the near-end input signal may be better.

In some embodiments, K may be set equal to M−1. That is, after a detection for N consecutive periods, if the sub-band index corresponding to the highest correlation is not the maximum index M−1, only the adaptive filter, the near-end analysis filter, and the far-end analysis filter corresponding to the maximum sub-band index may be turned off. And the buffer position of the near-end buffer pool 515 corresponding to each near-end analysis filter may be shifted by one buffer position toward the end corresponding to the latest buffered signal.

Via the above approach, the numbers of the working near-end analysis filters, the working far-end analysis filters, and the working adaptive filters may be gradually reduced, so that the reliability of the working states adjustment may be improved, and the performance of the echo cancellation on the near-end input signal may be better.

In some embodiments, the K may be not lower than a first predetermined threshold. That is, if the controller 540 detects that the number of current sub-bands corresponding to the signal filter 500 or 700 has been reduced to the first predetermined threshold during the process of dynamically turning off filters, the controller 540 may not further turn off the remaining filters.

For example, the signal filter 500 or 700 may be capable of processing the near-end signal with up to 100 sub-bands, that is, the signal filter 500 or 700 may include 100 adaptive filters, 100 near-end analysis filters, and 100 far-end analysis filters. The first predetermined threshold may be 50. Then in the process of adjusting the number of sub-bands, the adaptive filters, the near-end analysis filters, and the far-end analysis filters corresponding to up to 50 sub-bands may be turned off.

Via the above approach, the number of the final sub-bands of the signal filter 500 or 700 may be limited not lower than the first predetermined threshold, so that the echo cancellation capability of the signal filter 500 or 700 may be maintained within a predetermined range, and the stability of the signal filter 500 or 700 may be improved.

It may be noted that, the above descriptions about the signal filters 500 and 700 are only for illustration purposes, and not intended to be limiting. It is understood that, after learning the major concept and the mechanism of the present disclosure, a person of ordinary skills in the art may alter the signal filter 500 or 700 in an uncreative manner. The alteration may include combining and/or splitting components, adding or removing optional components, etc. All such modifications are within the protection scope of the present disclosure.

FIG. 8 is a flowchart illustrating an exemplary echo cancellation process 800 according to some embodiments of the present disclosure. The process 800 may be performed by the signal filter 500, the signal filter 800, or the adaptive filter bank 530 for echo cancellation. In some embodiments, one or more operations of the process 800 illustrated in FIG. 8 may be implemented in the communication system 100 illustrated in FIG. 1. For example, the process 800 illustrated in FIG. 8 may be stored in a storage device (e.g., the RAM 240, the storage device 220) in the form of instructions, and invoked and/or executed by one or more processors (e.g., the processor 210).

As illustrated in FIG. 8, the method may include:

Operation 810: obtaining (e.g., by the adaptive filter bank 530) a near-end signal $D(n)$ and a far-end signal $X(n)$, wherein the near-end signal $D(n)$ may include M near-end sub-band signals $d_i(n)$, the far-end signal $X(n)$ may include M far-end sub-band signals $x_i(n)$, N may be the sampling time point of the signal, i may be a sub-band index, i=0, 1, . . . , M−1.

Operation 820: filtering (e.g., by the adaptive filter bank 530), for each sub-band of the M sub-bands, based on the corresponding far-end sub-band signal $x_i(n)$, the corresponding near-end sub-band signal $d_i(n)$ to generate an error signal $e_i(n)$ corresponding to the sub-band.

Operation 830: combining (e.g., by the adaptive filter bank 530 or the adder 770) the error signals $e_i(n)$ corresponding to the M sub-bands to generate a combined error signal $ec(n)$.

Operation 840: Obtaining (e.g., by the adaptive filter bank 530 or the transformation module 775) an echo-cancelled near-end signal $E(n)$ by frequency-to-time transforming the combined error signal $ec(n)$.

In some embodiments, during the processing of the near-end signal $D(n)$ and the far-end signal $X(n)$, according to a preset period, for each sub-band of the M sub-bands, the correlation between the near-end sub-band signal $d_i(n)$ and the far-end sub-band signal $x_i(n)$ may be detected (e.g., by the adaptive filter bank 530 or the controller 540). Upon a detection that, for the N (N≥1) consecutive periods, the sub-band indexes (e.g., the target indexes) corresponding to the highest correlations between the near-end sub-band signals $d_i(n)$ and the far-end sub-band signals $x_i(n)$ are all lower than K, the filtering of the near-end sub-band signals $d_i(n)$ corresponding to the sub-band indexes between K and M−1 may be stopped, wherein K≥M−1.

In some embodiments, the obtaining the near-end signal $D(n)$ and the far-end signal $X(n)$ in the operation 810 may include: receiving the M near-end sub-band signals $d_i(n)$ from the near-end analysis filter bank 510, and receiving the M far-end sub-band signals $x_i(n)$ from the far-end analysis filter bank 520.

In some embodiments, a near-end analysis filter of the near-end analysis filter bank 510 may transmit the near-end sub-band signal corresponding to one sub-band, and a far-end analysis filter of the far-end analysis filter bank 520 may transmit the far-end sub-band signal corresponding to one sub-band. The M near-end sub-band signals $d_i(n)$ transmitted by the near-end analysis filter bank 510 may be obtained by: obtaining, form the near-end buffer pool 515, by the near-end analysis filter bank 510, an original near-end signal corresponding to the time length of M sub-bands; and time-to-frequency transforming, by the near-end analysis filter bank 510, the original near-end signal to generate the M near-end sub-band signals $d_i(n)$. One buffer position of the near-end buffer pool 515 may correspond to one near-end analysis filter of the near-end analysis filter bank 510. Different near-end analysis filters may obtain the corresponding portions of the original near-end signal buffered in different buffer positions of the near-end buffer pool 515. The M far-end sub-band signals $x_i(n)$ transmitted by the far-end analysis filter bank 520 may be obtained by: obtaining, form the far-end buffer pool 525, by the far-end analysis filter bank 520, an original far-end signal corresponding to the time length of M sub-bands; and time-to-frequency transforming, by the far-end analysis filter bank 520, the original far-end signal to generate the M far-end sub-band signals $x_i(n)$. One buffer position of the far-end buffer pool 525 may correspond to one far-end analysis filter of the far-end analysis filter bank 520. Different far-end analysis filters may obtain the corresponding portions of the original far-end signal buffered in different buffer positions of the far-end buffer pool 525.

In some embodiments, the filtering, for each sub-band of the M sub-bands, based on the corresponding far-end sub-band signal $x_i(n)$, the corresponding near-end sub-band signal $d_i(n)$ to generate an error signal $e_i(n)$ corresponding to the sub-band in the operation 820 may include: generating, for each sub-band of the M sub-bands, an estimated echo signal $x_i'(n)$ corresponding to the sub-band based on the far-end sub-band signal $x_i(n)$ and a previously outputted combined error signal $ec(n)$; and removing, for each sub-band of the M sub-bands, the corresponding estimated echo signal $x_i'(n)$ from the corresponding near-end sub-band signal $d_i(n)$ to obtain the error signal $e_i(n)$ corresponding to the sub-band.

In some embodiments, the generating, for each sub-band of the M sub-bands, an estimated echo signal $x_i=(n)$ corresponding to the sub-band based on the far-end sub-band signal $x_i(n)$ and a previously outputted combined error signal $ec(n')$: performing, for each sub-band of the M sub-bands, a NLMS algorithm on the far-end sub-band signal $x_i(n)$ and the previously outputted combined error signal $ec(n')$ to obtain the corresponding estimated echo signal $x_i'(n)$.

In some embodiments, the detecting, for each sub-band of the M sub-bands, the correlation between the near-end sub-band signal $d_i(n)$ and the far-end sub-band signal $x_i(n)$ may include detecting, for each sub-band of the M sub-bands, the updated coefficient value of the adaptive filter.

In some embodiments, the detection that, for the N consecutive periods, the sub-band indexes corresponding to the highest correlations between the near-end sub-band signals $d_i(n)$ and the far-end sub-band signals $x_i(n)$ are all lower than K may include a detection that, for the N consecutive periods, for all the M sub-bands, the sub-band indexes corresponding to the highest updated coefficient values of the adaptive filters are all lower than K.

In some embodiments, K may be no lower than a first predetermined threshold.

In some embodiments, the total duration of the consecutive N periods may be equal to a total time length of a predetermined number of sub-bands, wherein the time length of a sub-band may be the time length for receiving a corresponding near-end/far-end signal portion of the original near-end/far-end signal.

It should be noted that the above descriptions of the process 800 are only for demonstration purposes, and not intended to limit the scope of the present disclosure. It is understandable that, after learning the major concept of the present disclosure, a person of ordinary skills in the art may alter the process 800 in an uncreative manner. For example, the operations above may be implemented in an order different from that illustrated in FIG. 8. One or more optional operations may be added to the flowcharts. One or more operations may be split or be combined. All such modifications are within the scope of the present disclosure.

Figure 9:
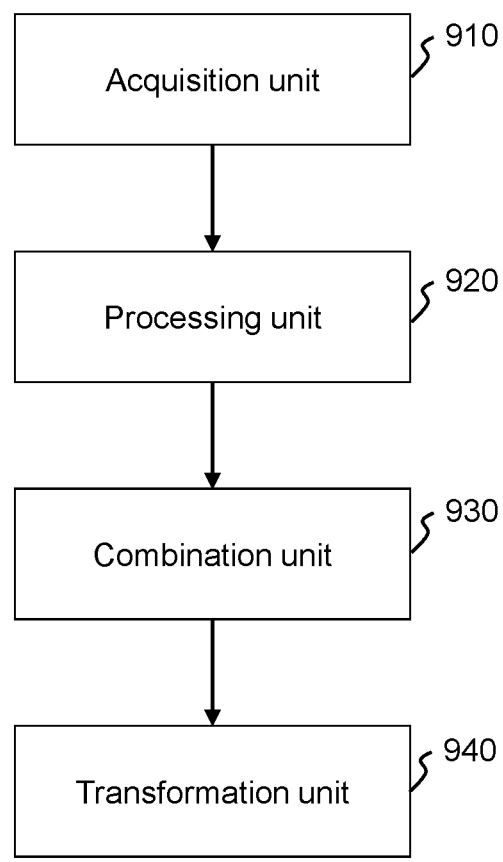
FIG. 9 is a schematic diagram illustrating an exemplary adaptive filter bank according to some embodiments of the present disclosure.

FIG. 9 is a schematic diagram illustrating an exemplary adaptive filter bank 900 according to some embodiments of the present disclosure. The adaptive filter bank 900 may be a combination of the adaptive filter bank 330 and the controller 340. The adaptive filter bank 900 may include an acquisition unit 910, a processing unit 920, a combination unit 930, and a transformation unit 940. The adaptive filter bank 900 may perform the process 800 as illustrated in FIG. 8. One or more of the components of the adaptive filter bank 900 may be hardware circuits or software modules. In some embodiments, the adaptive filter bank 900 may be implemented by a programmed processor (e.g., the processor 210 illustrated in FIG. 2).

The acquisition unit 910 may be configured to obtain a near-end signal $D(n)$ and a far-end signal $X(n)$, wherein the near-end signal $D(n)$ may include M near-end sub-band signals $d_i(n)$, the far-end signal $X(n)$ may include M far-end sub-band signals $x_i(n)$, N may be the sampling time point of the signal, i may be a sub-band index, i=0, 1, . . . , M−1.

The processing unit 920 may be configured to filter, for each sub-band of the M sub-bands, based on the corresponding far-end sub-band signal $x_i(n)$, the corresponding near-end sub-band signal $d_i(n)$ to generate an error signal $e_i(n)$ corresponding to the sub-band.

The combination unit 930 may be configured to combine the error signals $e_i(n)$ corresponding to the M sub-bands to generate a combined error signal $ec(n)$.

The transformation unit 940 may be configured to obtain an echo-cancelled near-end signal $E(n)$ by frequency-to-time transforming the combined error signal $ec(n)$.

In some embodiments, during the processing the near-end signal $D(n)$ and the far-end signal $X(n)$, the processing unit 920 may detect, according to a preset period, for each sub-band of the M sub-bands, the correlation between the near-end sub-band signal $d_i(n)$ and the far-end sub-band signal $x_i(n)$. In response to a detection that, for the N consecutive periods, the sub-band indexes corresponding to the highest correlations between the near-end sub-band signals $d_i(n)$ and the far-end sub-band signals $x_i(n)$ are all lower than K, the processing unit 920 may stop filtering the near-end sub-band signals $d_i(n)$ corresponding to the sub-band indexes between K and M−1, wherein K≤M−1.

In some embodiments, the acquisition unit 910 may be configured further to receive the M near-end sub-band signals $d_i(n)$ from the near-end analysis filter bank 510, and receive the M far-end sub-band signals $x_i(n)$ from the far-end analysis filter bank 520.

In some embodiments, the processing unit 920 may be configured further to: generate, for each sub-band of the M sub-bands, an estimated echo signal $x_i'(n)$ corresponding to the sub-band based on the far-end sub-band signal $x_i(n)$ and a previously outputted combined error signal $ec(n')$; and remove, for each sub-band of the M sub-bands, the corresponding estimated echo signal $x_i'(n)$ from the corresponding near-end sub-band signal $d_i(n)$ to obtain the error signal $e_i(n)$ corresponding to the sub-band.

In some embodiments, the processing unit 920 may be configured further to perform, for each sub-band of the M sub-bands, a NLMS algorithm on the far-end sub-band signal $x_i(n)$ and the previously outputted combined error signal $ec(n')$ to obtain the corresponding estimated echo signal $x_i'(n)$.

In some embodiments, the processing unit 920 may be configured further to: detect, for each sub-band of the M sub-bands, the updated coefficient value of the adaptive filter; and detect that, for the N consecutive periods, for all the M sub-bands, the sub-band indexes corresponding to the highest updated coefficient values of the adaptive filters are all lower than K.

It should be noted that the above descriptions of the process 400 are only for demonstration purposes, and not intended to limit the scope of the present disclosure. It is understandable that, after learning the major concept of the present disclosure, a person of ordinary skills in the art may alter the process 400 in an uncreative manner. For example, the operations above may be implemented in an order different from that illustrated in FIG. 4. One or more optional operations may be added to the flowcharts. One or more operations may be split or be combined. All such modifications are within the scope of the present disclosure.

Having thus described the basic concepts, it may be rather apparent to those skilled in the art after reading this detailed disclosure that the foregoing detailed disclosure may be intended to be presented by way of example only and may be not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment may be included in at least one embodiment of the present disclosure. Therefore, it may be emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that may be not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby, and Groovy, or other programming languages. The program code may execute entirely on the user's computer, partly on the user's computer, as a stand-alone software package, partly on the user's computer and partly on a far-end computer or entirely on the far-end computer or server. In the latter scenario, the far-end computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, may be not intended to limit the claimed processes and methods to any order except as may be specified in the claims. Although the above disclosure discusses through various examples what may be currently considered to be a variety of useful embodiments of the disclosure, it may be to be understood that such detail may be solely for that purposes, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purposes of streamlining the disclosure aiding in the understanding of one or more of the various inventive embodiments. This method of disclosure, however, may be not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein may be hereby incorporated herein by this reference in its entirety for all purposes, excepting any prosecution file history associated with same, any of same that may be inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and describe.

We claim:

1. A method for operating a signal filter device, the signal filter device including M adaptive filters, M first analysis filters, M second analysis filters, and a controller, M being an integer above two, the method comprising:

generating, by the M first analysis filters, M first sub-band signals based on an input signal;

generating, by the M second analysis filters, M second sub-band signals based on a reference signal; and adjusting, by the controller, the working states of the M adaptive filters;

wherein the adjusting the working states of the M adaptive filters comprising:

obtaining, by the controller, for each of the M first sub-band signals, a correlation parameter indicating a correlation between the first sub-band signal and the corresponding second sub-band signal;

detecting, by the controller, whether a first condition is satisfied based on the obtained correlation parameters; and in response to a detection that the first condition is satisfied, causing, by the controller, at least one target adaptive filter of the M adaptive filters to stop working.

2. The method of claim 1, wherein:
the M adaptive filters are currently working adaptive filters of the signal filter device; and
the signal filter device further includes currently non-working adaptive filters.

3. The method of claim 1, wherein:
the signal filter device further includes a first storage module;
portions of the input signal are stored in a plurality of first storage units of the first storage module, each of which corresponds to one of the M first analysis filters; and
the generating the M first sub-band signals based on the input signal comprises:
for each of the M first analysis filters:
receiving, by the first analysis filter, a portion of the input signal stored in the first storage unit corresponding to the first analysis filter; and
performing, by the first analysis filter, a time-to-frequency transformation on the portion of the input signal to obtain the corresponding first sub-band signal.

4. The method of claim 1, further comprising:
causing, by the controller, the first analysis filter and the second analysis filter corresponding to the at least one target adaptive filter to stop working.

5. The method of claim 4, further comprising, after causing the first analysis filter and the second analysis filter corresponding to the at least one target adaptive filter to stop working:
updating frequency bands of one or more of remainders of the M first analysis filters and frequency bands of the corresponding second analysis filters.

6. The method of claim 1, the obtaining, for each of the M first sub-band signals, a correlation parameter comprising:
receiving, by the controller, from the corresponding adaptive filter, at least part of automatically adjusted coefficients used for generating an estimated signal to be subtracted from the first sub-band signal based on at least the corresponding second sub-band signal; and
computing, by the controller, the correlation parameter based on the at least part of automatically adjusted coefficients.

7. The method of claim 1, wherein:
the M first sub-band signals corresponds to M sub-band indexes ranging between 0 and M−1; and
the detecting whether a first condition is satisfied based on the obtained correlation parameters comprises:
identifying, by the controller, in each period of N consecutive periods, a first index of the M sub-band indexes corresponding to the maximum correlation parameter of the period, wherein N is an integer above 1; and
detecting, by the controller, that a second condition is satisfied based on the first indexes of the N consecutive periods.

8. The method of claim 7, wherein:
the second condition is that the first indexes of the N consecutive periods are lower than K, wherein K is an integer equal to or less than M−1; and
the at least one target adaptive filter includes an adaptive filter corresponding to a sub-band index between K and M−1.

9. The method of claim 8, wherein K is above a first predetermined threshold.

10. The method of claim 7, wherein:
the second condition is that the maximum of the first indexes of the N consecutive periods is lower than M and M is above a second predetermined threshold; and
the at least one target adaptive filter includes the adaptive filter corresponding to the sub-band index M−1.

11. The method of claim 1, wherein:
the signal filter device provides bidirectional audio communications between a near-end user and a far-end user;
the input signal is a near-end audio signal; and
the reference signal is a far-end audio signal.

12. A signal filter device for reducing a reference signal in an input signal, comprising:
a bank of first analysis filters, each of which is configured to generate a first sub-band signal based on a portion of an input signal;
a bank of second analysis filters, each of which is configured to generate a second sub-band signal based on a portion of a reference signal;
a bank of adaptive filters, configured to generate, for each of the plurality of first sub-band signals, based on at least the corresponding second sub-band signal, an estimated signal to be subtracted from the first sub-band signal; and
a controller, configured to adjust working states of the bank of adaptive filters;
wherein to adjust the working states of the bank of adaptive filters, the controller is configured to:
obtain, for each of M first sub-band signals generated by M first analysis filters of the bank of first analysis filters, a correlation parameter indicating a correlation between the first sub-band signal and the second sub-band signal generated by the corresponding second analysis filters of the bank of second analysis filters, the M first analysis filters corresponding to M working adaptive filters of the bank of adaptive filters, wherein M is an integer above two;
detect whether a first condition is satisfied based on the obtained correlation parameters; and
in response to a detection that the first condition is satisfied, cause, by the controller, at least one target adaptive filter of the M working adaptive filters to stop working.

13. The signal filter device of the claim 12, wherein:
the signal filter device further includes a first storage module;
portions of the input signal are stored in a plurality of first storage units of the first storage module, each of which corresponds to one of the M first analysis filters; and
each of the M first analysis filters is configured to:
receive a portion of the input signal stored in the first storage unit corresponding to the first analysis filter; and
perform a time-to-frequency transformation on the portion of the input signal to obtain the corresponding first sub-band signal.

14. The signal filter device of the claim 12, wherein the controller is configured further to:

cause the first analysis filter and the second analysis filter corresponding to the at least one target adaptive filter to stop working.

15. The signal filter device of the claim 14, wherein after causing the first analysis filter and the second analysis filter corresponding to the at least one target adaptive filter to stop working, the controller is configured to:

update frequency bands of one or more of remainders of the M first analysis filters and frequency bands of the corresponding second analysis filters.

16. The signal filter device of the claim 12, wherein to obtain, for each of the M first sub-band signals, a correlation parameter, the controller is configured to:

receive, from the corresponding adaptive filter, at least part of automatically adjusted coefficients used for generating an estimated signal to be subtracted from the first sub-band signal based on at least the corresponding second sub-band signal; and compute the correlation parameter based on the at least part of automatically adjusted coefficients.

17. The signal filter device of claim 12, wherein:

the M first sub-band signals corresponds to M sub-band indexes ranging between 0 and M−1; and to detect whether the first condition is satisfied based on the obtained correlation parameters, the controller is configured to:

identify, in each period of N consecutive periods, a first index of the M sub-band indexes corresponding to the maximum correlation parameter of the period, wherein N is an integer above 1; and detect that a second condition is satisfied based on the first indexes of the N consecutive periods.

18. A non-transitory computer readable medium, storing instructions, the instructions when executed by a processor, causing the processor to execute operations comprising:

obtaining, for each of M first sub-band signals generated by M first analysis filters, a correlation parameter indicating a correlation between the first sub-band signal and a second sub-band signal generated by a corresponding second analysis filters, the M first analysis filters corresponding to M working adaptive filters, wherein M is an integer above two;

detecting whether a first condition is satisfied based on the obtained correlation parameters; and in response to a detection that the first condition is satisfied, causing at least one target adaptive filter of the M working adaptive filters to stop working.

* * * * *